(12) United States Patent
Hirota et al.

(10) Patent No.: US 11,163,517 B2
(45) Date of Patent: Nov. 2, 2021

(54) DISPLAY DEVICE FOR A VEHICLE HAVING MIGRATION OF IMAGE DISPLAY

(71) Applicant: TOYOTA JIDOSHA KABUSHIKI KAISHA, Toyota (JP)

(72) Inventors: Takahiro Hirota, Nukata-gun (JP); Koji Aikawa, Nagoya (JP); Shigeto Muramatu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/143,510

(22) Filed: Jan. 7, 2021

(65) Prior Publication Data

US 2021/0124545 A1   Apr. 29, 2021

Related U.S. Application Data

(62) Division of application No. 16/502,155, filed on Jul. 3, 2019, now Pat. No. 10,915,287.

(30) Foreign Application Priority Data

Jul. 26, 2018 (JP) .............................. JP2018-140603

(51) Int. Cl.
*G06F 3/14* (2006.01)
*G02B 27/01* (2006.01)
(Continued)

(52) U.S. Cl.
CPC ............ *G06F 3/1446* (2013.01); *B60K 37/02* (2013.01); *G02B 27/0101* (2013.01);
(Continued)

(58) Field of Classification Search
CPC ................. G06F 3/1445; G06F 3/1423; G02B 2027/0118; G02B 2027/0183;
(Continued)

(56) References Cited

U.S. PATENT DOCUMENTS

| 2011/0095878 A1* | 4/2011 | Skaff ..................... B60W 50/14 340/441 |
| 2011/0261039 A1 | 10/2011 | Kubota |

(Continued)

FOREIGN PATENT DOCUMENTS

| JP | 2006-103589 A | 4/2006 |
| JP | 2011-230625 A | 11/2011 |

OTHER PUBLICATIONS

Jun. 29, 2020 Office Action issued in U.S. Appl. No. 16/502,155.
(Continued)

*Primary Examiner* — Ryan A Lubit
(74) *Attorney, Agent, or Firm* — Oliff PLC

(57) ABSTRACT

There is provided a display device for a vehicle, the display device including: a first display unit that is provided at a meter display and that is visible to an occupant of a vehicle; a second display unit that is provided at a projection surface of a head-up display, and that is above and adjacent to the first display unit in a line of sight of the occupant; a memory; and a processor that is connected to the memory, in a case in which an operational state of a function relating to the vehicle has automatically changed, the processor causing display of an image indicating the operational state on the second display unit, and then causing migration of display of the image to the first display unit.

10 Claims, 12 Drawing Sheets

(51) Int. Cl.
*B60K 37/02* (2006.01)
*G09G 5/10* (2006.01)

(52) U.S. Cl.
CPC ............... *B60K 2370/1529* (2019.05); *G02B 2027/0118* (2013.01); *G09G 5/10* (2013.01); *G09G 2320/0626* (2013.01); *G09G 2360/144* (2013.01); *G09G 2380/10* (2013.01)

(58) Field of Classification Search
CPC ............ G02B 27/01; G02B 2027/0141; G02B 27/0101; G09G 2360/144; G09G 2380/10; G09G 2320/0626; B60K 37/02; B60K 35/00; B60K 2370/1529
See application file for complete search history.

(56) References Cited

U.S. PATENT DOCUMENTS

| | | |
|---|---|---|
| 2013/0145482 A1 | 6/2013 | Ricci et al. |
| 2015/0354178 A1* | 12/2015 | Jeong ............... E02F 9/267 340/438 |
| 2016/0012274 A1* | 1/2016 | Chen ............... G06K 9/00604 382/103 |
| 2016/0372085 A1* | 12/2016 | Lee ............... G06F 3/04883 |
| 2017/0144617 A1* | 5/2017 | Lee ............... B60K 31/0008 |
| 2017/0282717 A1* | 10/2017 | Jang ............... G06F 3/04817 |
| 2018/0065482 A1* | 3/2018 | Yagyu ............... B60K 35/00 |
| 2018/0091085 A1* | 3/2018 | Tamagaki ......... B60W 60/0051 |
| 2018/0146519 A1* | 5/2018 | Osumi ............... G03B 21/10 |
| 2018/0215264 A1 | 8/2018 | Shoji et al. |
| 2018/0356630 A1 | 12/2018 | Masuya |
| 2019/0004514 A1 | 1/2019 | Hiwatashi et al. |
| 2019/0071015 A1 | 3/2019 | Inagaki et al. |
| 2019/0308501 A1 | 10/2019 | Saka et al. |
| 2020/0150444 A1* | 5/2020 | Nohara ............... G02B 27/01 |

OTHER PUBLICATIONS

Apr. 13, 2020 Restriction/Election issued in U.S. Appl. No. 16/502,155.
Oct. 6, 2020 Notice of Allowance issued in U.S. Appl. No. 16/502,155.

\* cited by examiner

DISPLAY DEVICE FOR A VEHICLE HAVING MIGRATION OF IMAGE DISPLAY

CROSS-REFERENCE TO RELATED APPLICATION

This application is a divisional of U.S. application Ser. No. 16/502,155 filed Jul. 3, 2019, which is based on and claims priority under 35 USC 119 from Japanese Patent Application No. 2018-140603 filed on Jul. 26, 2018, the entire disclosure of these prior applications being incorporated by reference herein.

BACKGROUND

Technical Field

The present disclosure relates to a display device for a vehicle.

Related Art

Japanese Patent Application Laid-Open (JP-A) No. 2011-230625 discloses a display device for a vehicle including a meter serving as a first display section, and a head-up display serving as a second display section.

This display device for a vehicle has a function to coordinate the brightness of the meter display and the brightness of the display on the head-up display with each other.

However, in display devices for a vehicle including a meter and a head-up display, it is desirable that the contents of a display on the meter and the display of the head-up display are coordinated with each other such that a user can intuitively understand what the contents signify.

SUMMARY

An object of the present disclosure is to obtain a display device for a vehicle capable of emphatic visual communication to an occupant of a change in an operational state of a vehicle function that is difficult for the occupant to notice.

A display device for a vehicle of a first aspect includes a first display unit that is provided at a meter display and that is visible to an occupant of a vehicle, a second display unit that is provided at a projection surface of a head-up display, and that is above and adjacent to the first display unit in a line of sight of the occupant, and a controller that, in a case in which an operational state of a function relating to the vehicle has automatically changed, causes display of an image indicating the operational state on the second display unit, and then causes migration of display of the image to the first display unit.

"Migration" refers to causing a display corresponding to or related to a display that has been cleared from one of the display units to appear on the other of the display units. The timings at which the displays are cleared or appear may be simultaneous, or may be staggered. An "operational state" includes operational or non-operational states of devices relating to vehicle functions, as well as activated or disabled setting states of such functions.

The display device of the first aspect is applied to a vehicle provided with automatic functions such as automatic lighting and automatic wipers. For example, it is difficult to notice when front headlights have been switched on at dusk through a window. However, the display device of the first aspect is capable of emphatic visual communication to the occupant of an operational state that is difficult for the occupant to notice, such as an illuminated state of automatic lighting.

A display device for a vehicle of a second aspect includes a first display unit that is provided at a meter display and that is visible to an occupant of a vehicle, a second display unit that is provided at a projection surface of a head-up display, and that is above and adjacent to the first display unit in a line of sight of the occupant, and a controller that, in a case in which a function that is activated when the vehicle is started up has been disabled by the occupant, periodically causes display of an image indicating a disabled state on the second display unit, and then causes migration of display of the image to the first display unit.

"Migration" and "operational state" are as defined above. The display device of the second aspect is applied to a vehicle provided with safety functions such as Vehicle Stability Control (VSC) and a lane-keep system. For example, if a safety function such as VSC has been disabled, even though this state is displayed on a meter, an occupant might not notice that the safety function has been disabled in the case of an ongoing disabled state. The display device of the second aspect is capable of emphatic visual communication to the occupant of an operational state that would be difficult for the occupant to notice, such as disabling of a safety function.

A display device for a vehicle of a third aspect is the first or the second aspect, wherein after causing migration of the image that was already being displayed on the first display unit so as to be displayed on the second display unit, the controller causes migration of display of the image back to the first display unit.

The display device of the third aspect enables the occupant to be notified that an operational state of a function had already changed prior to emphatic display of an image indicating the operational state of the function.

A display device for a vehicle of a fourth aspect is any one of the first aspect to the third aspect, wherein the controller causes migration of the image between the second display unit and the first display unit using an animation.

The display device of the fourth aspect enables the occupant to be notified of a change in an operational state of a function in a manner that does not appear awkward.

A display device for a vehicle of a fifth aspect is any one of the first aspect to the fourth aspect, wherein the controller causes display of the image using different designs on the second display unit and the first display unit.

The display device of the fifth aspect is applied in cases in which a function is expressed visually on the second display unit even when notification is performed on the first display unit using a simple indicator. The display device of the fifth aspect is capable of assisting understanding of vehicle functions by an occupant.

The present disclosure is capable of emphatic visual communication, to an occupant, of a change in an operational state of a vehicle function that is difficult for the occupant to notice.

BRIEF DESCRIPTION OF THE DRAWINGS

Exemplary embodiments of the present invention will be described in detail based on the following figures, wherein:

FIG. 3A is a diagram illustrating images displayed on a display unit of a display device for a vehicle according to the first exemplary embodiment prior to headlights being switched on;

FIG. 3B is a diagram illustrating images displayed on a display unit of a display device for a vehicle according to the first exemplary embodiment during a change in which the headlights are switched on;

FIG. 3C is a diagram illustrating images displayed on a display unit of a display device for a vehicle according to the first exemplary embodiment during a change in which the headlights are switched on;

FIG. 3D is a diagram illustrating images displayed on a display unit of a display device for a vehicle according to the first exemplary embodiment after the headlights have been switched on;

FIG. 3E is a diagram illustrating images displayed on a display unit of a display device for a vehicle according to the first exemplary embodiment after a fixed duration has elapsed since the headlights have been switched on;

DETAILED DESCRIPTION

Explanation follows regarding a display device 10 serving as a display device for a vehicle according to exemplary embodiments of the present disclosure, with reference to FIG. 1 to FIG. 4. Note that in the context of FIG. 1, FIG. 3, and FIG. 4, "in front" refers to being in front when looking toward the front of a vehicle from the vehicle rear.

First Exemplary Embodiment

Figure 1:
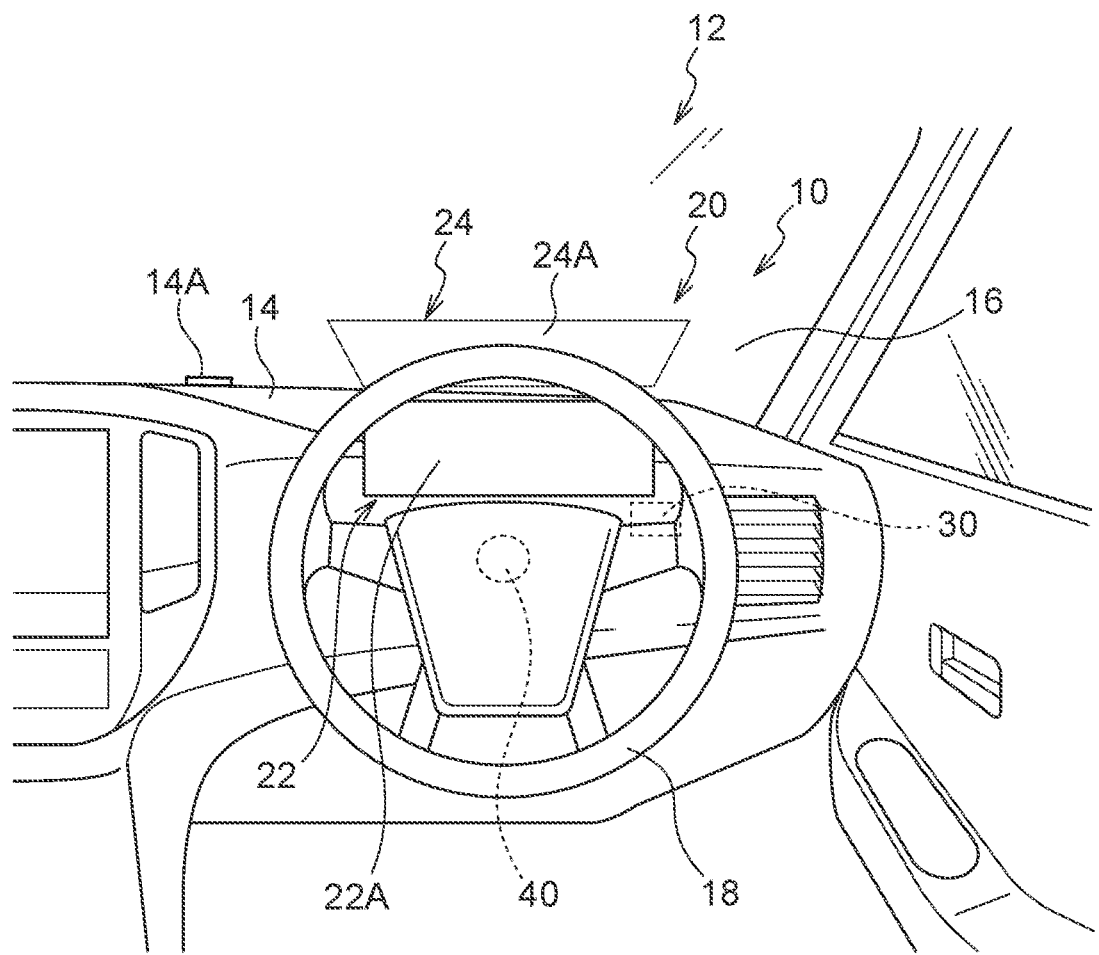
FIG. 1 is a face-on view of a display unit provided on a driving seat side, the display unit configuring a display device for a vehicle according to a first exemplary embodiment.

FIG. 1 illustrates a display device 10 of a first exemplary embodiment. As illustrated in FIG. 1, the display device 10 of the present exemplary embodiment includes a display unit 20 provided in front of an occupant in a driving seat of a vehicle 12, and a control device 30 that controls image contents displayed on the display unit 20.

The display unit 20 includes a liquid crystal display 22A serving as a first display unit provided at a meter display 22, and a projection screen 24A serving as a second display unit provided at a projection screen of a head-up display 24. The projection screen 24A displays an image adjacent to and at the vehicle upper side of the liquid crystal display 22A, in a line of sight of the occupant.

To explain further, in the vehicle 12 of the present exemplary embodiment, the meter display 22 is provided in front of a dashboard 14. The liquid crystal display 22A is provided in front of the meter display 22. In the vehicle 12 of the present exemplary embodiment, the head-up display 24 is provided adjacent to and at the vehicle front side of the meter display 22 on the dashboard 14. The head-up display 24 includes a projector 24B inside the dashboard 14. An image is projected from the projector 24B onto the projection screen 24A set at a front window 16, this being a projection surface. Note that the projection surface of the head-up display 24 is not limited to the front window 16, and a combiner (reflective panel) provided at the dashboard 14 may serve as the projection surface.

Figure 2:
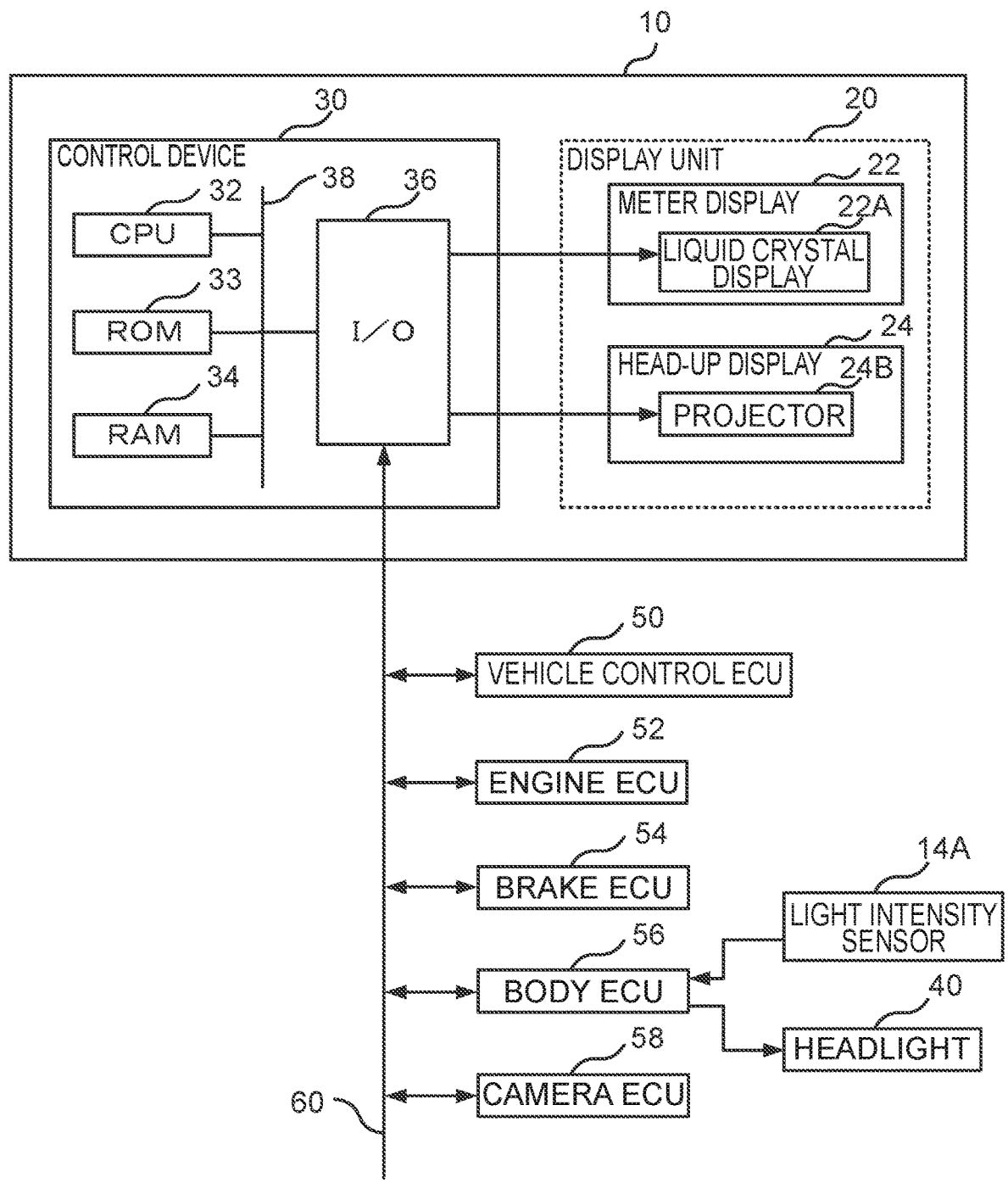
FIG. 2 is a block diagram illustrating configuration of a display device for a vehicle according to the first exemplary embodiment.

The control device 30 is provided inside the dashboard 14 so as to be near to the display unit 20. As illustrated in FIG. 2, hardware of the control device 30 includes a Central Processing Unit (CPU) 32 serving as an example of a processor, Read Only Memory (ROM) 33, Random Access Memory (RAM) 34, and an input/output interface (I/O) 36. The CPU 32, the ROM 33, the RAM 34, and the I/O 36 are connected together through a bus 38. Note that the control device 30 may also include non-volatile memory such as a Hard Disk Drive (HDD) or a Solid State Drive (SSD) in addition to the ROM 33, or in place of the ROM 33.

A display program for executing display processing in the CPU 32, and image data and the like for display on the display unit 20, are stored in the ROM 33. The CPU 32 reads the display program from the ROM 33 and expands the display program in the RAM 34. The CPU 32 operates as a controller by loading and executing the display program. Note that the display program may be stored in a non-transitory recording medium such as a Digital Versatile Disc (DVD), read using a recording medium reading device, and expanded in the RAM 34.

The meter display 22 and the head-up display 24 configuring the display unit 20 are connected to the I/O 36.

Various Electronic Control Units (ECUs) are also connected to the I/O 36. The ECUs connected to the control device 30 include a vehicle control ECU 50, an engine ECU 52, a brake ECU 54, a body ECU 56, and a camera ECU 58. These ECUs are connected through a controller area network (CAN) 60. Note that the connection method is not limited thereto, and the various ECUs may for example be connected through a gateway ECU.

The vehicle control ECU 50 is an ECU that controls safety functions such as Vehicle Stability Control (VSC), traction control, and a lane-keep system. The vehicle control ECU 50 realizes these safety functions by coordinating with other ECUs, such as the engine ECU 52, the brake ECU 54, and the camera ECU 58.

The engine ECU 52 is an ECU that controls engine output. The engine ECU 52 acquires the speed of the vehicle 12 and the engine revolution speed in order to control the engine. In the present exemplary embodiment, the vehicle speed and engine revolution speed are transmitted from the engine ECU 52 to the I/O 36.

The brake ECU 54 is an ECU that controls braking. For example, when a cruise control function has been activated, the brake ECU 54 controls braking of the wheels such that vehicle 12 travels at a preset speed, or such that a uniform distance is maintained between the vehicle 12 and a vehicle traveling in front.

The body ECU 56 is an ECU that controls lights including headlights 40, power windows, and so on. The vehicle 12 of the present exemplary embodiment is installed with automatic lighting that is automatically switched on or off according to the light intensity outside the vehicle. A light intensity sensor 14A provided at the dashboard 14, and the headlights 40 provided at a front section of the vehicle 12, are electrically connected to the body ECU 56. The body ECU 56 switches on the headlights 40 in cases in which the light intensity outside the vehicle detected by the light intensity sensor 14A has fallen below a preset threshold value, and switches off the headlights 40 in cases in which the light intensity outside the vehicle detected by the light intensity sensor 14A has exceeded the threshold value. The body ECU 56 transmits the operational state of the headlights 40, namely, whether the headlights 40 are switched on or switched off, to the I/O 36.

The camera ECU 58 has a function to detect a situation in the surroundings of the vehicle 12 based on information acquired from various sensors, such as a camera, millimeter-wave radar, or Light Detection and Ranging/Laser Imaging Detection and Ranging (LIDAR) provided at an outer section of the vehicle 12. The camera ECU 58 detects a vehicle traveling ahead of the vehicle 12 based on the information acquired from the various sensors, thereby enabling the vehicle control ECU 50 to make the vehicle 12 follow the vehicle ahead while maintaining a fixed distance based on the detected information. The camera ECU 58 transmits detection information regarding the vehicle in front and the situation in the surroundings of the vehicle 12 to the I/O 36.

The display device 10 configured as described above operates as described below.

As illustrated in FIG. 3A to FIG. 3E, in the display unit 20 of the present exemplary embodiment, the liquid crystal display 22A is positioned at the vehicle lower side, and the projection screen 24A is positioned adjacent to and at the vehicle upper side of the liquid crystal display 22A, in the line of sight of an occupant seated in the driving seat.

Figure 3A:
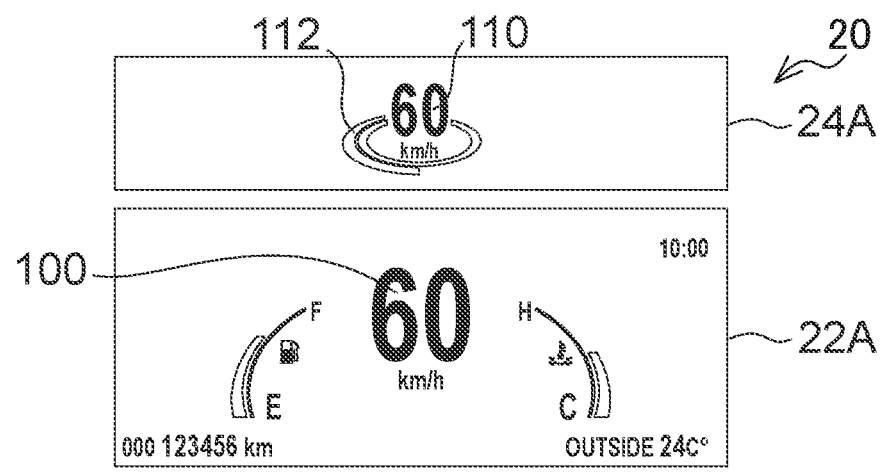
Figure 3B:
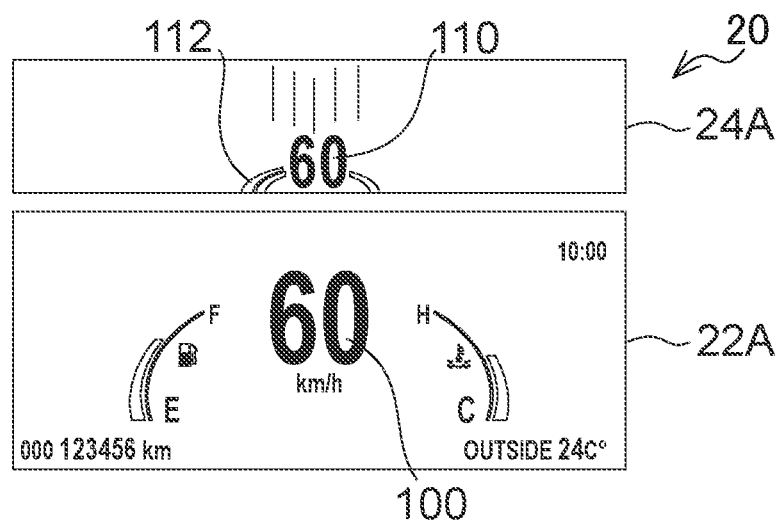

FIG. 3A to FIG. 3E are examples illustrating states of the display unit 20 of the vehicle 12 installed with an automatic lighting function. As illustrated in FIG. 3A, prior to switching on the headlights 40, a vehicle speed image 100 indicating the speed of the vehicle 12 is displayed at the center of the liquid crystal display 22A. Moreover, a vehicle speed image 110 indicating the speed of the vehicle 12 is displayed at the center of the projection screen 24A, and a level image 112 indicating a vehicle speed level is displayed around the vehicle speed image 110.

Note that the body ECU 56 switches on the headlights 40 in cases in which the light intensity outside the vehicle as detected by the light intensity sensor 14A has fallen below the preset threshold value, and transmits information indicating that the headlights 40 have been switched on to the control device 30. When the control device 30 receives information indicating that the headlights 40 have been switched on, the control device 30 changes the image on the display unit 20 in the following manner.

Figure 3C:
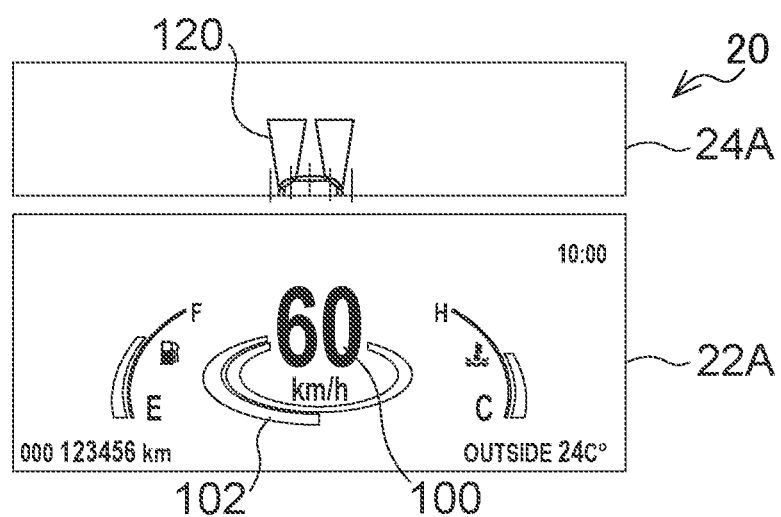
Figure 3D:
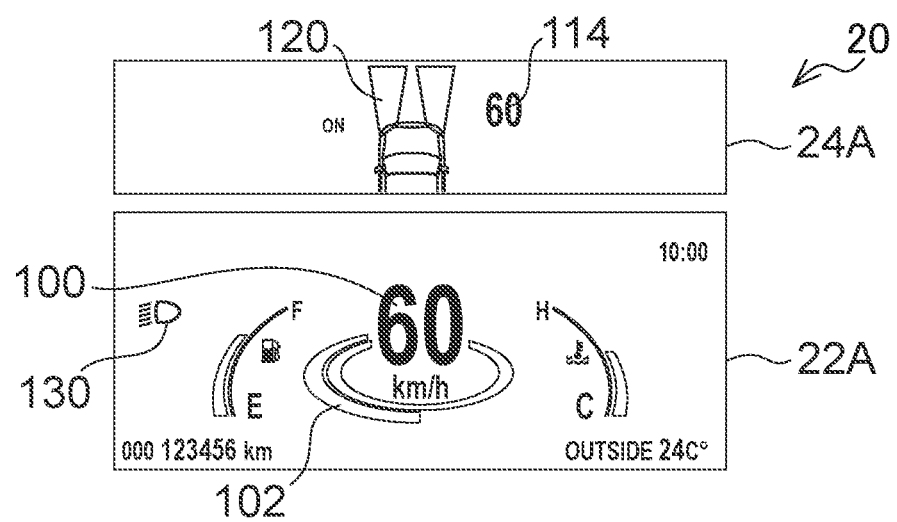
Figure 3E:
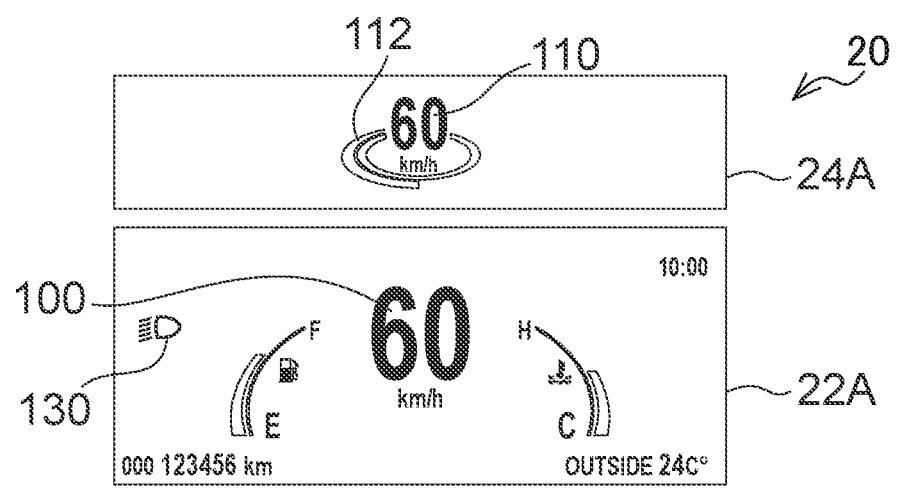

First, the CPU 32 causes the vehicle speed image 110 and the level image 112 on the projection screen 24A to slide out downward (see FIG. 3B), and then causes a pictorial image 120 representing the illuminated state of the headlights 40 to slide in from below (see FIG. 3C). As illustrated in FIG. 3D, the CPU 32 also displays a vehicle speed image 114 with a smaller number of pixels than the pictorial image 120 on the right side of the pictorial image 120.

Meanwhile, the CPU 32 displays a level image 102 indicating the vehicle speed level around the vehicle speed image 100 on the liquid crystal display 22A, and displays a lights-on indicator 130 indicating the illuminated state of the headlights 40 on the left side of the liquid crystal display 22A.

After the above changes, the pictorial image 120 and the vehicle speed image 114 are displayed on the projection screen 24A of the display unit 20. After a predetermined duration (approximately 2 to 3 seconds) has elapsed, the CPU 32 clears the vehicle speed image 114 and causes the pictorial image 120 to slide out downward.

At the same time as causing the pictorial image 120 to slide out from the projection screen 24A, the CPU 32 also clears the level image 102 on the liquid crystal display 22A. The CPU 32 then causes the vehicle speed image 110 and the level image 112 to slide in to the projection screen 24A from below. The images on the display unit 20 therefore become those illustrated in FIG. 3E. Note that display of the lights-on indicator 130 on the left side of the liquid crystal display 22A continues.

Second Exemplary Embodiment

A second exemplary embodiment is an example of the display unit 20 in a case in which a VSC function has been disabled by an occupant.

Figure 4A:
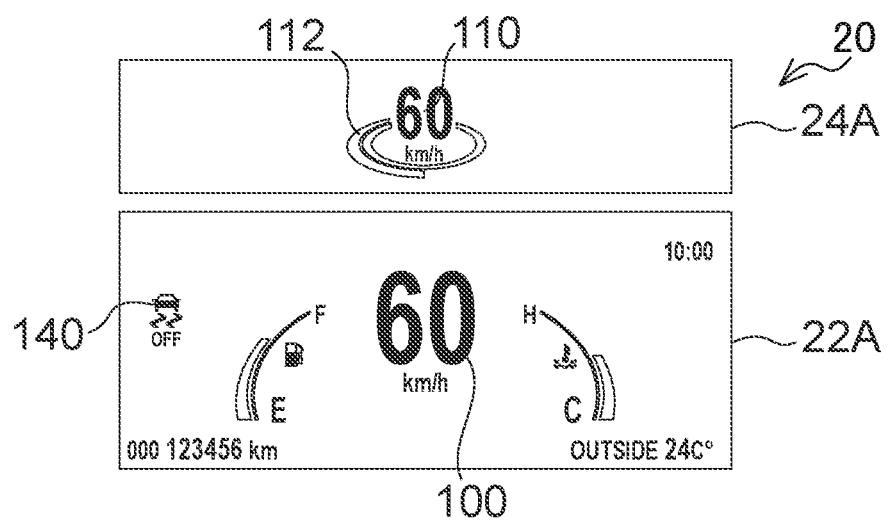
FIG. 4A is a diagram illustrating an image normally displayed on a display unit of a display device for a vehicle according to a second exemplary embodiment when a VSC function has been disabled.
Figure 4B:
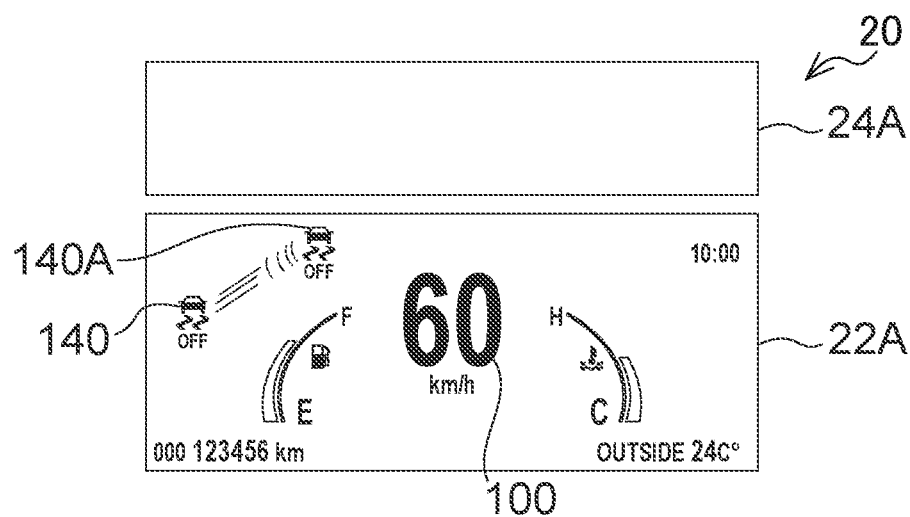
FIG. 4B is a diagram illustrating emphatic display of an image on a display unit of a display device for a vehicle according to the second exemplary embodiment when a VSC function has been disabled.
Figure 4C:
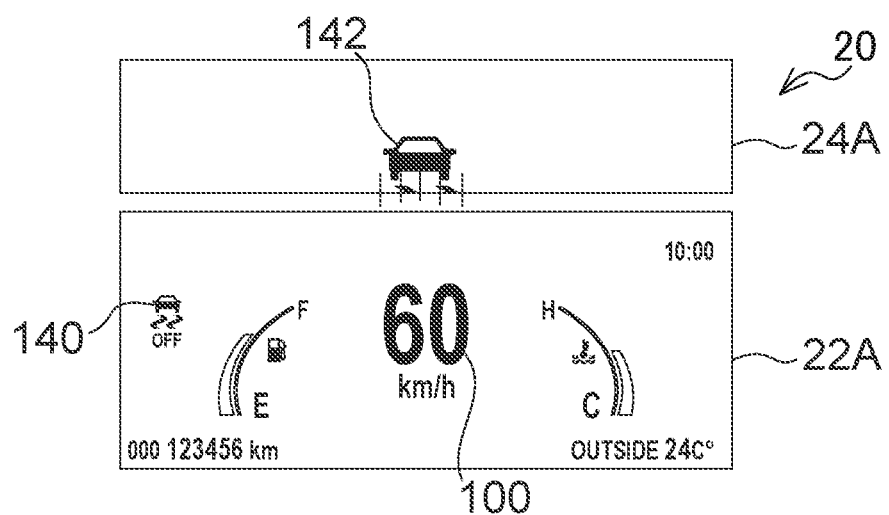
FIG. 4C is a diagram illustrating emphatic display of an image on a display unit of a display device for a vehicle according to the second exemplary embodiment when a VSC function has been disabled.

Although safety devices such as VSC are normally activated when the vehicle 12 is started up, these functions can be disabled using a switch provided on a center console or the like. For example, as illustrated in FIG. 4A, in cases in which the occupant has disabled the VSC function, a function-disabled indicator 140 indicating that the VSC function has been disabled is displayed on the left side of the liquid crystal display 22A.

At this time, the vehicle speed image 100 indicating the speed of the vehicle 12 is displayed at the center of the liquid crystal display 22A, the vehicle speed image 110 indicating the speed of the vehicle 12 is displayed at the center of the projection screen 24A, and the level image 112 indicating a vehicle speed level is displayed around the vehicle speed image 110.

After a preset duration has elapsed since disabling the VSC function, the CPU 32 changes the displays on the liquid crystal display 22A and the projection screen 24A. Specifically, the CPU 32 first causes the vehicle speed image 110 and the level image 112 on the projection screen 24A to slide out downward. The CPU 32 then creates a duplicate of the function-disabled indicator 140 away from its original position on the liquid crystal display 22A, and then moves the separated duplicate function-disabled indicator 140A diagonally upward and toward the center so as to slide out from the liquid crystal display 22A (see FIG. 4B).

The CPU 32 causes an enlarged function-disabled indicator 142, this being an enlarged version of the function-disabled indicator 140, to slide in to the projection screen 24A from below (see FIG. 4C) in coordination with the function-disabled indicator 140A sliding out from the liquid crystal display 22A. Meanwhile, the level image 102 indicating the vehicle speed level is displayed around the vehicle speed image 100 on the liquid crystal display 22A.

Figure 4D:
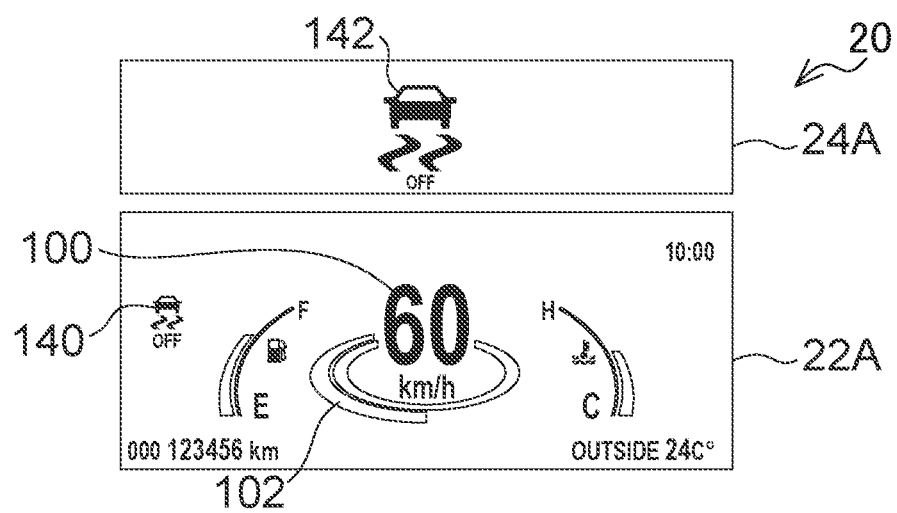
FIG. 4D is a diagram illustrating emphatic display of an image on a display unit of a display device for a vehicle according to the second exemplary embodiment when a VSC function has been disabled.

As illustrated in FIG. 4D, after the above changes, the enlarged function-disabled indicator 142 is displayed at the center of the projection screen 24A, and the function-disabled indicator 140 is displayed on the left side of the liquid crystal display 22A of the display unit 20. After a predetermined duration (approximately 2 to 3 seconds) has elapsed, the CPU 32 causes the enlarged function-disabled indicator 142 to slide out downward.

The CPU 32 causes the function-disabled indicator 140A to slide in to the liquid crystal display 22A from above in coordination with the enlarged function-disabled indicator 142 sliding out from the projection screen 24A. The CPU 32 then moves the function-disabled indicator 140A that has slid in diagonally downward and toward the left side, and superimposes the function-disabled indicator 140A on the function-disabled indicator 140 that has remained in a displayed state since disabling the VSC function. The CPU 32 then causes the vehicle speed image 110 and the level image 112 to slide in to the projection screen 24A from below.

Figure 4E:
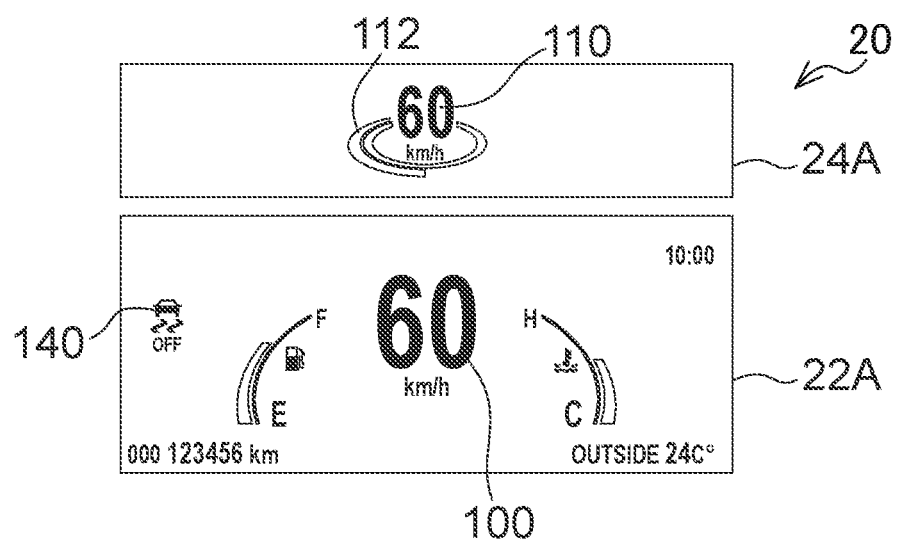
FIG. 4E is a diagram illustrating a display of an image on a display unit of a display device for a vehicle according to the second exemplary embodiment after a fixed duration has elapsed following the start of emphatic display when a VSC function has been disabled.

As illustrated in FIG. 4E, after the above changes, the respective displays of the display unit 20 return to their original display states (see FIG. 4A). Note that although the changes to the images on the display unit 20 illustrated in FIG. 4A to FIG. 4E are executed at preset intervals in the present exemplary embodiment, there is no limitation thereto, and these changes may be executed at a timing when the vehicle 12 has stopped, or at a timing when the vehicle 12 enters a curve.

Operation and Advantageous Effects

Explanation follows regarding operation and advantageous effects of the display device 10 of each of the above exemplary embodiments.

A feature of the display device 10 of the first exemplary embodiment is that the following control is performed by the CPU 32, serving as a controller, in cases in which the headlights 40 have been automatically switched on by the automatic lighting function. Specifically, the CPU 32 displays the pictorial image 120 indicating the illuminated state on the projection screen 24A, and then performs display migration such that the pictorial image 120 is replaced with the lights-on indicator 130 on the liquid crystal display 22A.

Note that in the display migration of the first exemplary embodiment, the lights-on indicator 130 related to the pictorial image 120 appears on the liquid crystal display 22A at the same time as the pictorial image 120 slides out from the projection screen 24A. In the display device 10 of the first exemplary embodiment, the illuminated state of the headlights 40 that is normally notified using the liquid crystal display 22A of the meter display 22 can be emphasized using the head-up display 24. For example, the occupant might not notice when the automatic lighting function is activated and the headlights 40 are switched on at dusk. The first exemplary embodiment enables emphatic visual communication to the occupant of the operational state of the headlights 40, which is difficult for the occupant to notice.

Another feature of the display device 10 of the first exemplary embodiment is that different designs are displayed on the projection screen 24A and the liquid crystal display 22A to notify of the illuminated state. Specifically, in the first exemplary embodiment, the lights-on indicator 130 with a simple design is displayed on the liquid crystal display 22A, and the pictorial image 120 that enables the illuminated state to be visually understood is displayed on the projection screen 24A. Thus, in the first exemplary embodiment, even if the occupant does not understand the meaning of the indicator, the image displayed on the projection screen 24A can assist understanding of the vehicle function to which the indicator relates.

A feature of the display device 10 of the second exemplary embodiment is that the CPU 32 serving as a controller performs the following control in cases in which a function such as VSC that is activated when the vehicle 12 is started up has been disabled by an occupant. Specifically, the CPU 32 periodically displays the enlarged function-disabled indicator 142 indicating the disabled state on the projection screen 24A, and then performs display migration in which the enlarged function-disabled indicator 142 is migrated to display of the function-disabled indicator 140 on the liquid crystal display 22A.

Note that in the display migration of the second exemplary embodiment, the function-disabled indicator 140A with a smaller number of pixels than the enlarged function-disabled indicator 142 appears on the liquid crystal display 22A at the same time as the enlarged function-disabled indicator 142 slides out from the projection screen 24A. When a safety function such as VSC has been disabled, the occupant might not notice that this disabled state is ongoing, even if this state is displayed on the liquid crystal display 22A. To address this, the display device 10 of the second exemplary embodiment is capable of emphatic visual communication to the occupant of an operational state such as disabling of a safety function, which is difficult for the occupant to notice.

Another feature of the display device 10 of the second exemplary embodiment is as follows. Namely, the CPU 32 enlarges the function-disabled indicator 140 that is already being displayed on the liquid crystal display 22A, migrates to display of the enlarged function-disabled indicator 142 on the projection screen 24A, and then migrates back to display of the function-disabled indicator 140 on the liquid crystal display 22A.

The second exemplary embodiment enables the occupant to be notified that an operational state of a function has already changed prior to emphatic display of an image indicating the operational state of the function.

Note that although notification in cases in which the VSC function has been disabled is given as an example in the second exemplary embodiment, there is no limitation thereto. The second exemplary embodiment may for example also be applied in cases in which an idling stop function has been disabled, cases in which a blind spot monitor has been disabled, or cases in which a brake hold function has been disabled.

Another feature of the display device 10 of each of the exemplary embodiments is that the CPU 32 employs animation in the display migration of images between the liquid crystal display 22A and the projection screen 24A. Namely, the display device 10 of each of the exemplary embodiments enables the occupant to be notified that a change in the operational state of a function has occurred in a manner that does not appear awkward to the occupant.

In the display device 10 of each of the exemplary embodiments, after an indicator has been emphatically displayed using the projection screen 24A of the head-up display 24 for a fixed duration, the indicator is then migrated to display on the liquid crystal display 22A. Setting the duration of the emphatic display to a length enabling the occupant to fully understand the content of the image enables any feeling of annoyance toward the display by the occupant to be suppressed.

Note that although the animation employed in the display unit 20 of the respective exemplary embodiments is related to movement of images, such as sliding in and sliding out, there is no limitation thereto. For example, an indicator image may be progressively changed to another pictorial image, or the color or brightness of the image may be changed as the image moves.

What is claimed is:

1. A display device for a vehicle, the display device comprising:

a first display unit that is provided at a meter display and that is visible to an occupant of a vehicle;
a second display unit that is provided at a projection surface of a head-up display, and that is above and adjacent to the first display unit in a line of sight of the occupant;
a memory; and
a processor connected to the memory, wherein
in a case in which a function that is activated when the vehicle is started up has been disabled by the occupant, the processor periodically causes display of a disabled state image indicating a disabled state on the second display unit, and then causes migration of display of the disabled state image to the first display unit.

2. The display device of claim 1, wherein
after causing migration of the disabled state image that was already being displayed on the first display unit so as to be displayed on the second display unit, the processor causes migration of display of the disabled state image back to the first display unit.

3. The display device of claim 1, wherein
the processor causes migration of the disabled state image between the second display unit and the first display unit using an animation.

4. The display device of claim 1, wherein
the processor causes display of the disabled state image using different designs on the second display unit and the first display unit.

5. The display device of claim 1, wherein
the processor causes the disabled state image displayed on the second display unit to be enlarged compared to the disabled state image displayed on the first display unit.

6. The display device of claim 1, wherein
in a case where the disabled state image is caused to be displayed on the second display unit, another image that has been cleared from the second display unit is caused to be displayed on the first display unit together with a speed image related to a speed of the vehicle.

7. The display device of claim 1, wherein
the processor causes display of the disabled state image using different colors or brightnesses on the second display unit and the first display unit.

8. The display device of claim 1, wherein
the migration of the display of the disabled state image from the second display unit to the first display unit is displayed by displaying a sliding movement of the disabled state image on the second display unit.

9. A method comprising:
in a case in which a function that is activated when a vehicle is started up has been disabled by an occupant,
periodically causing display of a disabled state image indicating a disabled state on a second display unit; and
then causing migration of display of the disabled state image to a first display unit, wherein the first display unit is provided at a meter display and is visible to the occupant of the vehicle, and the second display unit is provided at a projection surface of a head-up display and is above and adjacent to the first display unit in a line of sight of the occupant.

10. A non-transitory computer-readable medium storing a program that, when executed by a processor, causes the processor to:
in a case in which a function that is activated when a vehicle is started up has been disabled by an occupant,
periodically cause display of a disabled state image indicating a disabled state on a second display unit; and
then cause migration of display of the disabled state image to a first display unit, wherein the first display unit is provided at a meter display and is visible to the occupant of the vehicle, and the second display unit is provided at a projection surface of a head-up display and is above and adjacent to the first display unit in a line of sight of the occupant.

\* \* \* \* \*